United States Patent
Haas et al.

(10) Patent No.: US 11,375,424 B2
(45) Date of Patent: Jun. 28, 2022

(54) NETWORK ACCESS ENTITY FOR DYNAMICALLY RECONFIGURABLE NETWORKS

(71) Applicant: BLACKNED GMBH, Heimertingen (DE)

(72) Inventors: Timo Haas, Erlenmoos (DE); Heiner Schöllkopf, Ulm (DE)

(73) Assignee: Blackned GMBH, Heimertingen (DE)

( * ) Notice: Subject to any disclaimer, the term of this patent is extended or adjusted under 35 U.S.C. 154(b) by 9 days.

(21) Appl. No.: 16/622,922

(22) PCT Filed: Jun. 23, 2017

(86) PCT No.: PCT/EP2017/000736
§ 371 (c)(1),
(2) Date: Dec. 16, 2019

(87) PCT Pub. No.: WO2018/233800
PCT Pub. Date: Dec. 27, 2018

(65) Prior Publication Data
US 2021/0153090 A1    May 20, 2021

(51) Int. Cl.
*H04W 36/14*    (2009.01)
*H04W 36/00*    (2009.01)

(52) U.S. Cl.
CPC ....... *H04W 36/14* (2013.01); *H04W 36/0061* (2013.01)

(58) Field of Classification Search
CPC .......................... H04W 36/14; H04W 36/0061
See application file for complete search history.

(56) References Cited

U.S. PATENT DOCUMENTS 9,445,256 B1 * 9/2016 Cole .................... H04L 61/1588
2011/0007748 A1    1/2011 Yin et al.
(Continued)

FOREIGN PATENT DOCUMENTS

CN    104618976 A    5/2015
EP    2887733 A1     6/2015
(Continued)

OTHER PUBLICATIONS

CN104618976 Abstract & Bibilo WIPO.
(Continued)

*Primary Examiner* — Marisol Figueroa
(74) *Attorney, Agent, or Firm* — Wash Park IP Ltd.; John T. Kennedy (57) ABSTRACT

Systems and methods for data transmission are disclosed. A network access entity NAE provides access to communication services of a data network to at least one user equipment, UE. The NAE includes a packet data network gateway, PGW, with a PGW identifier, PGWID, which uniquely identifies the PGW. A UE mobility table contains an assignment of a UE identifier, UEID, of each UE to a PGW. The assignment indicates a PGWID of a PGW via which a specific UE is accessible from the data network. The NAE may transmit and receive data to and from a remote station via the data network, assign a data flow from the remote station to at least one UE, update the UE mobility table when a UE leaves the range of the NAE, and reassign a PGWID of a neighboring PGW to the leaving UE, via which neighboring PGW the UE can be reached.

14 Claims, 2 Drawing Sheets

| Entry | UE-ID | PGWID |
|-------|-------|-------|
| 1 | 50-1 | 3a |
| 2 | 50-2 | 3a |
| 3 | 50-3 | 3b |
| 4 | 50-4 | 3b |
| 5 | 50-5 | 3c |

(56) References Cited

U.S. PATENT DOCUMENTS

2015/0156660 A1* 6/2015 Luo .................. H04W 8/18
370/230
2016/0249233 A1* 8/2016 Murray ............... H04W 16/26

FOREIGN PATENT DOCUMENTS

EP          2806690 A4   12/2015
WO       2017063151 A1    4/2017

OTHER PUBLICATIONS

CN104618976 Claims WIPO Machine Translation.
CN104618976 Description WIPO Machine Translation.
CN104618976 Drawings Published as CN201310536040 Google Translation of Drawings.
CN201310536040 Chinese Publication of CN104618976.
EP17737720 Aug 17, 2020 Amendments before Examination.
EP17737720 Oct. 14, 2021 Annex to the Communication.
EP17737720 Oct. 14, 2021 Communication per Article 94(3).
PCT/EP/2017/00736 Dec. 27, 2018 International Search Report.
PCT/EP/2017/00736 Dec. 27, 2018 Written Opinion of the International Search Authority.
PCT/EP/2017/00736 Jan. 10, 2021 International Preliminary Report on Patentability.

* cited by examiner

| Entry | UE-ID | PGWID |
|---|---|---|
| 1 | 50-1 | 3a |
| 2 | 50-2 | 3a |
| 3 | 50-3 | 3b |
| 4 | 50-4 | 3b |
| 5 | 50-5 | 3c |

Fig. 3

NETWORK ACCESS ENTITY FOR DYNAMICALLY RECONFIGURABLE NETWORKS

CROSS REFERENCE TO PCT APPLICATION

The present application is a U.S. national stage filing, under 35 U.S.C. § 371(c), of Patent Cooperation Treaty (PCT) Application Serial No. PCT/EP2017000736, which was filed on 23 Jun. 2017, in the name of inventors Timo Haas and Heiner Schöllkopf and is entitled "Network Access Entity for Dynamically Reconfigurable Networks."

INTRODUCTION

The present disclosure relates to the technical field of communication networks. Particularly, the disclosure relates to a network access entity which is configured to provide access to mobile communication services of a data network to a user equipment, and to a data transmission system with a data network and at least two network access entities.

BACKGROUND

Communication networks are typically used for transmitting data from one end device to another end device via a central network control entity. For this purpose, communication networks implement and provide transportation services. Mobile communication networks support mobility of the end devices by providing and using different and/or multiple network access points.

According to the 3GPP, a collection of logical network functions supports the communication service requirements of particular use cases.

For example, the mobile communication standard relating to Long Term Evolution (LTE) distinguishes between a core network and an access network. The core network is typically referred to as evolved packet core (EPC), the main logical nodes of which are a PDN Gateway (PGW, packet data network gateway), a serving gateway (SGW), and a mobility management entity (MME). In addition to these nodes, an EPC includes other logical nodes and functions which are known and described in the standard related documents. The access network mainly consists of a network of eNodeBs (Evolved Node B) which communicate directly (typically in a wireless manner) with user equipment devices like mobile handsets.

Typically, UEs are mobile devices which are configured to communicate with other mobile devices by utilizing the services of a data network and access points to that data network. It may also be possible for the UEs to gain access to an external network like the Internet or any other global network via the access and core functionality of the data network and its access points. Thus, internal communication between two or more UEs is enabled using the data network and its functions alone if said two UEs are connected to the data network. Alternatively or additionally, external communication is enabled using the data network and the external network in order to access a remote station being connected to the external network.

SUMMARY

There may be a need to increase flexibility of a user equipment which is part of a communication network. Especially, there may be a need for a communication network which enables dynamic reconfiguration and assignment and/or reassignment of mobile or static user equipment to mobile or static network access entities with a maximum degree of service, in particular without interrupting an existing connection between a user equipment and another end device or service end point.

According to a first aspect, a network access entity is provided and is configured to provide access to communication services of a data network to at least one user equipment (UE). The network access entity comprises a packet data network gateway (PGW) with a PGW identifier (PGWID) which uniquely identifies the PGW, and a UE mobility table containing an assignment of a UE identifier (UEID) of each one of the at least one UE to one of multiple PGWs. The assignment of the UE to the PGW indicates a PGWID of that PGW via which a specific UE is accessible from the data network, i.e., to the one of multiple PGWs to which a specific UE is assigned and via which the UE can access services of the data network and/or via which the UE can be accessed by devices or remote stations via the data network. The PGW is configured to transmit and/or receive data to and from a remote station, respectively, via the data network, and to assign a data flow from the remote station to one of the at least one UE assigned to the PGW. The PGW is further configured to update the UE mobility table when a UE leaves the range of the network access entity, and to reassign a PGWID of a neighboring PGW to the leaving UE, via which neighboring PGW the leaving UE can be reached.

In other words, an update event of the mobility table is initiated when a UE leaves a cell assigned to a PGW and changes to a cell of another PGW. Such a process may be called inter-EPC-handover as it describes that a user equipment is handed over from a first PGW (a first EPC) to a second PGW (a second EPC) while both PGWs are connected directly or indirectly to the data network. The data network referred to herein may be a private backbone interconnecting multiple network access entities. Therefore, the user equipment is handed over from one EPC to another EPC still being connected to the private backbone.

Generally, it is noted that a network access entity comprises at least an EPC and a PGW. Whenever referring to the PGW or EPC, it is to be understood that the respective description is a functional definition of tasks carried out by the network access entity. Especially, the network access entity additionally comprises an air interface, like an eNodeB or the like, and is configured to establish a communication link with at least one UE.

For the same of clarity, it is distinguished between the terms inter-EPC-handover and intra-EPC-handover in this description. An inter-EPC-handover relates to a handover from one EPC to another EPC while an intra-EPC-handover relates to a handover between different eNodeBs of the same EPC. In the 3GPP standard, a handover typically relates to the access node and defines how and when a user equipment is handed over from a first eNodeB to a second eNodeB. However, such an intra-EPC-handover does typically not affect the core network and the user equipment has access to an external data network, like the Internet, via the same PGW.

Different techniques of intra-EPC-handovers are known in mobile communication networks, such as X2-handover and S1-handover, for example. These techniques are not described in detail herein. However, an inter-EPC-handover as described herein may especially be a S1 handover and require involving the mobility management entity (MME) when being implemented in an LTE-environment.

The user equipment may be subject to several handovers within the access network while it is still accessible by remote devices via the same PGW. When the user equipment changes the network provider, this is not just an inter-EPC-handover, as another network provider uses a different EPC with its PGW to provide access to the Internet or global network to the user equipment devices being connected to the network of this provider. In case of such an inter-EPC-handover, an existing connection of the handed over UE and a remote station (external to the EPC of the UE and accessible via the global network) will be typically interrupted, as the UE gains access to the global network via another PGW with its own PGWID while the remote station does not know the PGWID of the new PGW, and, even when the remote station knows the PGWID of the new PGW, a new connection between the UE, the new PGW, and the remote station must be established. This reconnection may require some time which may be undesired under several circumstances. Furthermore, the current approach enables a UE to keep an IP-address even when it is handed over from one EPC/PGW to another EPC/PGW. For this purpose, IP-address leases of a dynamic host configuration protocol (DHCP) may be synchronized between the network access entities. If no lease or no valid lease is available, a local DHCP-server may be requested for a new lease.

In order to overcome this drawback in case of an inter-EPC-handover, it is proposed to use a UE mobility table which contains information about all UEs in a network compound and the PGWs in the network compound via which each one of the UEs can be reached.

A network compound may comprise multiple network access entities, each of which implements the entire functionality or a main part of the functionality of an EPC, for example according to one of the 3GPP standards. Each network access entity may autonomously and alone serve as a communication network which grants access to multiple UEs to a data network or backbone or provides local services like voice communication to the connected UEs. Due to redundancy reasons and to allow flexibility relating to the configuration of a network compound, multiple network access entities may be used. The network access entities may be statically installed at predetermined positions or may be mobile units. Each network access entity may comprise one or more eNodeBs or other access elements (air interface) which allow an intra-EPC-handover, i.e., a UE is still accessible via the same PGW. However, as a result of motion of a network access entity or of the UE, an inter-EPC-handover may be required.

For the sake of clarity, in the context of an inter-EPC-handover, the terms former EPC and new EPC are used while the former EPC relates to that EPC to which the UE was assigned prior to the inter-EPC-handover and the new EPC relates to that EPC to which the UE is handed over.

In order not to interrupt data connections of a UE which is handed over to an EPC of another network access entity and to maintain existing connections between a UE and a remote station, the UE mobility table is provided and indicates the accessibility of the UE after an inter-EPC-handover. Thus, in a first stage, the former network access entity knows the new network access entity of the handed over UE and forwards any data packets received by the former network access entity and directed to the handed over UE to the new network access entity. In a second stage, after the UE mobility table is synchronized throughout the entire compound of network access entities, the network access entity assigned to the remote station knows the new network access entity (and/or its PGWID) of the handed over UE and the data packets addressed to the UE are sent directly to the new network access entity. In any case, the remote station addresses a data packet to the UE and the network access entity take care for the actual data flow by accessing the UE mobility table.

Hence, a network access entity which is designed as described herein may be used as a single access entity or within a network compound with multiple other similar or identical network access entities which are configured to provide data access to multiple UEs. Such a network compound is particularly suitable to provide redundancy and flexible reconfiguration when one of the network entities is broken down or moved to another location. Movement and dynamic location changing of the UEs and of the network access entities is enabled and at the same time, existing connections between UEs and remote stations are not interrupted. This provides high availability of network services under changing circumstances.

Furthermore, a network access entity can be used alone for establishing full mobile communication services as each network access entity implements the entire functionality of an EPC, especially in accordance with the standards of 3GPP and LTE, and/or IP-services like voice or data as described with reference to IP Multimedia Subsystem (IMS) of 3GPP. However, in order to extend the range and/or the number of possible UEs, multiple network access entities being interconnected with each other in a compound may be used such that mobility of the UEs and/or of the network access entities is enabled. Additionally, this approach also provides redundancy and fault tolerance, thus avoiding a single point of failure.

In case of an inter-EPC-handover, a UE registers with the new network access entity and the new network access entity updates its entry for the handed over UE in the UE mobility table accordingly, i.e., amends the entry such that it assigns the ID of the new network access entity to the handed over UE. Subsequently, this updated entry or the entire UE mobility table is synchronized between all network access entities of the network compound. As a result, the former network access entity as well as the network access entity assigned to the remote station receive the updated UE mobility table. The former network access entity and the network access entity assigned to the remote station both possess the required information to send data packets addressed to the handed over UE to the new network access entity. In the context of this description, the network access entity assigned to the remote station is referred to as source network access entity.

It may occur that the former network access entity receives the handover information before the source network access entity does. In that case, the source network access entity still sends data addressed to the handed over UE to the former network access entity. The former network access entity will know from its UE mobility table that the UE was handed over and also knows the PGWID of the new network access entity, so that the former network access entity is able to forward the data packets to the new network access entity. However, once the source network access entity receives the information about the mobility event, it will directly send the data packets to the new network access entity.

The network access entity may implement all or part of the core network functions according to the 4G LTE standard. A PGWID may particularly be the ID of the network access entity (together with its remaining components like EPC and PGW).

The network access entity may generally be defined as an access entity which provides services to a mobile UE. Multiple network access entities may be interconnected by using a backbone. At least one of the network access entities may be connected to an external or global network like the Internet so that this at least one network access entity provides access to the external or global network to any or a selected group of UEs connected to one of the network access entities.

As a PGW is part of a network access entity, the PGWID uniquely identifies a network access entity and may also be referred to as network access entity ID.

The UEID may identify a UE or a component that is part of the UE. For example, the UE may contain a subscriber identity module (SIM) having assigned a unique ID, which can be used as the UEID, as long as the SIM is included in the UE.

According to an embodiment, the network access entity is configured to update the UE mobility table when a UE enters the range of the network access entity by creating an entry or updating an existing entry for the entering UE (the handed over UE or a UE being switched on within the range of a network access entity) in the UE mobility table and to assign its own PGWID to the UEID of the entering UE.

For example, the UE mobility table may, as a standard or default configuration, contain an entry for every UE which is allowed to access the network compound and these entries may remain in the UE mobility table even if one of the UEs is inactive or switched off. An entry in the UE mobility table may contain a device identifier such that the network access entity may grant or deny access to the UEs based on the entries in the UE mobility table. Thus, a central access control or part thereof may be implemented by the UE mobility table.

Alternatively, access control may be done by a separate element and the UE mobility table does not contain any entry in the default configuration. Instead, entries are created when a UE enters the range of an EPC and after access to the network compound is granted.

Anyway, after a UE successfully registers with an EPC of a network access entity, the UE mobility table contains a corresponding entry and, after the mobility table is synchronized with all other network access entities of the network compound, this entry is available to all other network access entities, too. Thus, it is known in the entire network compound via which network access entity a UE is accessible and any network access entity is able to forward data addressed to the UE to the assigned network access entity which can locally access the UE.

According to a further embodiment, the network access entity is configured to broadcast an update of the UE mobility table to neighboring network access entities.

A network access entity may broadcast information about a UE entering its range to those network access entities of the network compound to which it has direct links. In the network compound, a network access entity may have a direct link to a first group of other network access entities, while it may not have a direct link to a second group of network access entities. According to this embodiment, the update of the mobility table is cast to those network access entities which have a direct link to the new network access entity after an inter-EPC-handover. However, in an alternative embodiment, the network access entity may also be configured to broadcast an update (or the entire UE mobility table) to all network access entities which are part of the network compound. In a preferred embodiment, the update of the mobility table is cast to those network access entities which were involved in the handover process, i.e., the source and destination network access entity.

It is noted that a synchronization mechanism may be implemented to update the UE mobility tables of the network access entities within the network compound. For this purpose, any known synchronization mechanisms may be used or a specific synchronization mechanism may be implemented.

For example, in an advantageous embodiment, the new network access entity first updates only the former network access entity and the source network access entity (if known) in order to forward or send data packets of existing connections as soon as possible with a minimum delay to the new network access entity and to the handed over UE. The remaining network access entities may be informed in a subsequent step. The new network access entity knows the UEID of the UE from its UE mobility table and may also obtain the PGWID of the former network access entity from the UE mobility table. Thus, the new network access entity may direct a unicast message to the former network access entity and/or to the source network access entity and inform these about the handover.

The neighboring network access entities may be those network access entities which are localized close to the new network access entity. It may be presumed that an inter-EPC-handover most likely occurs between network access entities which are located close to each other. Therefore, the information about the inter-EPC-handover may be of most importance to that group of network access entities which is located close to each other. Simply speaking, if the network compound extends over hundreds of square kilometers with hundred or more network access entities, an inter-EPC-handover is of most relevance for those network access entities which are located within the next 1 to 5 kilometers from the new network access entity as a mobility event (movement of the UE and/or the network access entity and a resulting inter-EPC-handover) is most likely to occur between neighboring network access entities.

According to a further embodiment, the network access entity is configured to search the UE mobility table for a UEID to which a received data packet is addressed to and to read out from the UE mobility table the PGWID of the PGW to which the UEID of the received data packet is assigned. The network access entity is further configured to forward the received data packet to the PGW with the read out PGWID.

In other words, any network access entity is configured to first read out the UE mobility table to determine accessibility of a UE. Subsequently, the network access entity either accesses the UE directly (when the respective UE is assigned to this network access entity) or it forwards the data packet to the new network access entity.

Typically, a data packet is forwarded once after an inter-EPC-handover from the former network access entity to the new network access entity and as long as the source network access entity sends data packets to the former network access entity of a handed over UE. However, under specific circumstances, a data packet may be forwarded twice or even more (from first network access entity to second network access entity to third network access entity) if multiple inter-EPC-handovers occur in a short time. For example, if the UE is handed over from a first network access entity to a second network access entity and subsequently to a third network access entity, there may be two forwarding actions if the first network access entity receives a data packet addressed to the UE before the first network access entity (and the source network access entity) receives the update information that the UE was handed over to the third network access entity. As described above, the forwarding only occurs as long as the source network access entity is not informed about the inter-EPC-handover.

It may occur that a network access entity receives a data packet addressed to a UE which is assigned to this network access entity in the UE mobility table, but the UE is not available. This may indicate that the UE was handed over to a new network access entity and the new network access entity has not sent the UE mobility table update yet. In this case, the receiving network access entity may buffer the data addressed to the UE for a predetermined time. For the buffering, any mechanisms may be used. The network access entity may also buffer only a predetermined amount or quantity of data. For this purpose, any incoming data may be given a time stamp. The amount or quantity (data amount threshold) and the time for buffering (buffer time threshold) the data may be defined in a configuration file. If one data packet exceeds the buffer time threshold, the buffered data may be discarded entirely or only those data packets with a time stamp exceeding the buffer time threshold. If the received data achieve the predetermined amount or quantity of data, those data with the earliest time stamp may be discarded, even without reaching or exceeding the buffer time threshold.

According to a further embodiment, the network access entity is configured to dynamically assign a UEID to a UE if a UE enters the range of the network access entity and to update the UE mobility table with the assigned UEID and the corresponding PGWID.

This enables a UE being assigned a UEID without having one statically configured. Typically, this approach may be advantageous if a UE initially registers in the network compound and does not have a UEID already assigned. Once a UE obtained a UEID, this UEID is valid as long as it is registered at one of the EPCs in the network compound. The UEID does typically not change after an inter-EPC-handover so that the former EPC can identify a UE even after the inter-EPC-handover.

According to a further embodiment, the network access entity implements the functionality of an evolved packet core, EPC, according to one of the following communication standards: 3GPP Release 8, 3GPP Release 9, 3GPP Release 10, 3GPP Release 11, 3GPP Release 12, 3GPP, Release 13.

According to a further aspect, a data transmission system is provided. The data transmission system comprises a data network, a first network access entity as described herein, and a second network access entity as described herein, wherein each of the first and second network access entity is connected to the data network so as to enable transmission of data between the first and second network access entity.

The data network may be any kind of backbone or a private wide access network (WAN) with restricted access or no access by the public. The data network may be a private communication network of public safety organizations, e.g., a military network, a police network, or rescue organization network. The first and second network access entities may establish a network compound as described above to grant access to multiple UEs to the data network. Thus, a UE may exchange data with another UE assigned to the same or different EPCs, e.g., to the first or second network access entity. Alternatively or additionally, any UE assigned to one of the EPC may also exchange data with any remote station connected to the data network, e.g., a server which provides data or information to the entire network compound. The data network referred to herein may be connected to other global networks, for example public networks like the Internet, to enable the UEs access to the Internet. In this scenario, one of the first or second network access entity acts as a gateway between the backbone and the global network. In one embodiment, the data network interconnecting the first network access entity and the second network access entity may be a direct connection between the network access entities.

The network access entities may be connected to the data network via wired or wireless links. For connecting the network access entities to the data network, redundant paths may be used. Also, paths with different protocols may be used. Every network access entity may be configured to establish a multi-protocol connection to the data network. A network access entity may be configured to define a data class for each connection of a UE, so that the transmission path is selected based on the data class.

According to an embodiment, the data transmission system is configured to synchronize the UE mobility table of the first network access entity with the UE mobility table of the second network access entity.

As described above, a suitable synchronization mechanism may be utilized or implemented to update the UE mobility tables between a group of network access entities or all network access entities.

According to another embodiment, at least one of the first and second network access entity is located onboard a mobile platform.

Thus, not just the UEs may be mobile devices, but also the network access entities may be installed onboard a mobile platform, e.g., a land based vehicle, an aircraft (helicopter, drone, plane, or the like), or a ship. The data transmission system and, in particular, the mobile access entities are designed such that multi-mobility is supported, i.e., intra-EPC-handover if a network access entity has multiple eNodeBs or inter-EPC-handover from one network access entity to another network access entity if either the mobile platform with the network access entity or the UE (or both, the network access entity and the UE) change their position and require a handover.

Furthermore, the data transmission system enables high redundancy and failure safety and, at the same time, high quality of service with increased reliability of established connections and no need to reestablish already existing connections after an inter-EPC-handover.

When one of the network access entities fails or does not work appropriate any more due to an incident, the UEs assigned to the failed network access entity may interconnect with an alternative (new) network access entity and the information about the newly established assignments between network access entities and UEs may be transmitted to all or part of the network access entities by synchronization of the UE mobility table.

According to a further embodiment, the data transmission system comprises a multitude of user equipment, UE, devices each of which is uniquely assigned to either the first or the second network access entity, wherein the assignment of the UE devices to the first or the second network access entity is indicated by an entry in the UE mobility tables, and wherein each entry in the UE mobility table contains a UE identifier, UEID, (and, preferably, an IP-address) of a UE device and the PGWID of the assigned PGW which identifies the respective network access entity.

According to a further embodiment, the first network access entity is configured to update its UE mobility table if a first UE device enters its range, to assign the UEID of the first UE device to the PGWID of the first network access entity, and to communicate the updated UE mobility table to the second network access entity.

According to a further embodiment, the second network access entity is configured to forward data packets it receives and which are addressed to the first UE device to the first network access entity. Typically, this data packet forwarding is done as long as the source network access entity is not aware about the inter-EPC-handover of the target UE. If the source network access entity receives the handover message of a UE, i.e., after synchronization of the UE mobility table, the source network access entity directs the data packets to the target UE directly to the new network access entity.

According to further embodiments, a method may be implemented with the functions of the components of the network access entity and the data transmission system described herein being implemented as method steps.

A method is provided for operating a data transmission system with a first network access entity and a second network access entity and multiple user equipment (UE) devices, wherein the first and second network access entities implement at least some of evolved packet core, EPC, functionality according to a 3GPP standard, in particular, Long Term Evolution, LTE. The method comprises the steps: registering a first UE at the first network access entity; assigning an identifier of the first network access entity to the first UE to indicate via which network access entity the first UE is accessible; handing over the first UE from the first network access entity to the second network access entity; assigning an identifier of the second network access entity to the first UE and informing the first network access entity about this assignment; storing, by the first network access entity, the newly assigned second network access entity as an access point for forwarding data received by the first network access entity and addressed to the first UE.

For this method, similar details apply as already provided with respect to the network access entity and the data transmission system. In order not to repeat all those details, reference is made to these devices and systems. The person skilled in the art will recognize that the functions of the network access device may be implemented as method steps and vice versa.

According to an embodiment, the method further comprises the step: forwarding, by the first network access entity, data packets addressed to the first UE to the second network access entity in accordance with the stored assignment.

This relates to forwarding data packets after an inter-EPC-handover, as described herein.

According to another embodiment, the method further comprises the step: broadcasting an assigned identifier of a network access entity to the first UE to other network access entities such that all network access entities within a network compound contain an entry relating to accessibility of the first UE.

This relates to synchronizing the UE mobility table.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses thereof. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

At least some functions of the network access entity described herein may be implemented in accordance with the principles of software defined networking, SDN. SDN is an approach that basically relates to decoupling the management and controlling tasks from data packet forwarding tasks. The management and controlling tasks are usually referred to as control plane whereas the forwarding tasks are referred to as data plane. This decoupling can simplify the structure of a network and can standardize interfaces between individual components and between the control and data plane. Typically, the data plane is configured such that it necessarily requires control commands from the control plane in order to meet the forwarding tasks. Simply speaking, the 'intelligence' of an SDN system is provided in the control plane whereas the data plane simply carries out commands and instructions previously known or received from the control plane.

One mechanism which relates to and defines the communication between the control plane and the data plane is OpenFlow. It should be understood that any reference to OpenFlow in the following generally relates to any mechanisms and interfaces which define the communication between the control plane and the data plane in SDN. Reference to OpenFlow is exemplarily made and is representative for any of these mechanisms and interfaces.

A typical SDN network is composed of simple switches (or forwarding elements) in the forwarding plane and an intelligent SDN controller that configures how those switches behave by installing flow (or forwarding) rules on the switches.

The controller is an entity that gathers and keeps an up-to-date per-flow network state.

The network access entity described herein may be implemented using SDN. Especially, the UE mobility table may be part of the control plane while the forwarding tasks may be implemented in the user plane.

In other words and with reference to embodiments described herein, the SDN controller has information about any UE in a data transmission system 1 and the network access entity assigned to each one of the UEs. Thus, the SDN controller can instruct the network access entities to send data packets to that one of the network access entities which is assigned to a target UE and based on the address of the target UE and the information contained in the UE mobility table.

Figure 1:
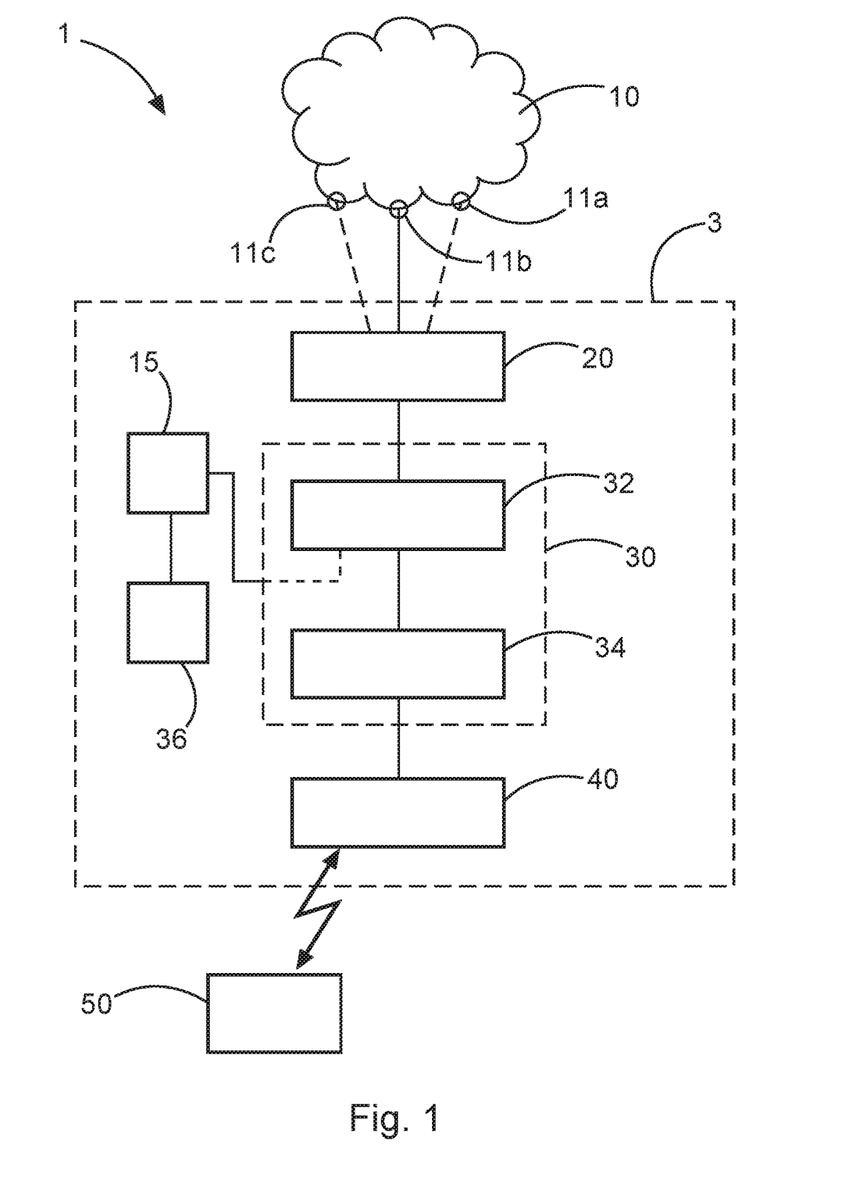
FIG. 1 schematically shows a data transmission system with a network access entity according to an exemplary embodiment.

FIG. 1 describes a data transmission system generally shown at 1. The data transmission system comprises at least one network access entity 3 and a data network 10. The data network 10 may be a private wide area access network (backbone), for example, while the network access entity 3 is configured to provide access to a multitude of UEs 50 to the data network 10. For this purpose, the network access entity 3 comprises an air interface to wirelessly interconnect the UEs 50.

The network access entity 3 may be connected to the data network 10 via multiple transmission paths and corresponding first, second, and third type access points 11a, 11b, 11c. However, this is optional and the network access entity 3 may also be connected to the data network 10 via a single transmission path and a single access point 11a.

When there are multiple access points 11a, 11b, 11c, these may be of different type (different quality of service, different protocol, etc.) and a multi-protocol multi-topology router 20 is provided to interconnect the network access entity 3 to the data network 10. Again, the router 20 is an optional element and may only be provided if different data traffic classes are required with different quality of service parameters. The router 20 may be implemented as part of the network access entity 3 or as an external unit.

The network access entity 3 also comprises a service architecture evolution (SAE) gateway 30 with a packet data network gateway (PGW) 32 and a serving gateway (SGW) 34. A UE mobility table 36 is provided (see for details FIG. 3) and serves as a basis for forwarding packets from one network access entity 3 to another network access entity after an inter-EPC-handover.

Furthermore, the network access entity 3 comprises an air interface, e.g., an eNodeB, 40, for wirelessly interconnecting the UEs 50. A network access entity may comprise one or multiple air interfaces 40.

The data flow controller 15 is connected to the UE mobility table 36 and gathers information about accessibility of UEs. After receiving a data packet for a UE 50, the data flow controller 15 determines the ID of the network access entity the addressed UE is assigned to. If the addressed UE is assigned to the current network access entity and can be reached directly via one of the eNodeBs 50 assigned to this network access entity, the data packet is transmitted to the addressed UE via the air interface of the current network access entity. Otherwise, the data packet is forwarded to another network access entity in accordance with the entry in the UE mobility table 36.

The data flow controller 15 may be implemented as an SDN controller as described above.

Figure 2:
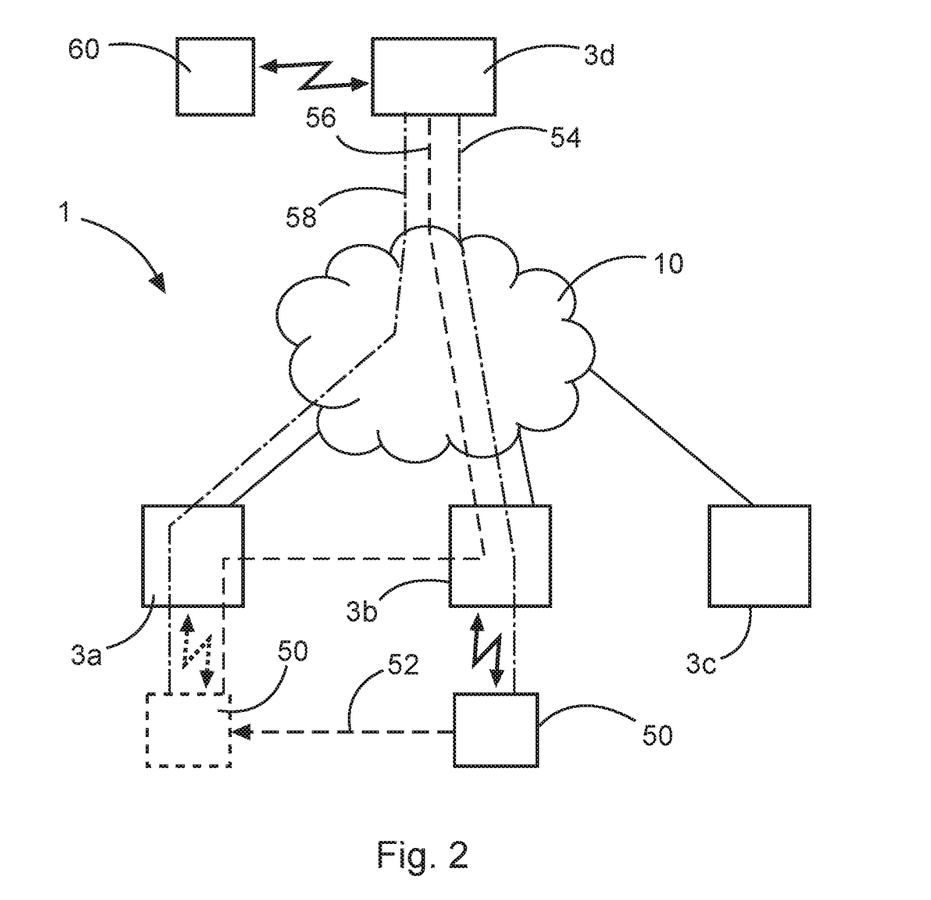
FIG. 2 schematically shows a data transmission system with multiple network access entities according to an exemplary embodiment.

FIG. 2 shows another example of a data transmission system 1 with four network access entities 3a, 3b, 3c, and 3d, a data network 10, and a remote station 60, e.g., a server or a remote UE. Multiple UEs 50, of which there is shown only one, may access the data network 10 via the network compound consisting of the multiple network access entities. The UEs 50 as well as the network access entities 3a, 3b, 3c, 3d may be mobile units or immobile and statically installed units. The network access entities 3a, 3b, 3c, and 3d are configured to enable dynamic reconfiguration of the data transmission system, i.e., adapting the data flow or data forwarding after an inter-EPC-handover as a result of mobile UEs 50 and/or of mobile network access entities 3a, 3b, 3c, 3d.

Each network access entity 3a, 3b, 3c, 3d implements core network functionality according to LTE standard, for example. Specifically, each network access entity implements part of an EPC. Therefore, a handover of a UE from the network access entity 3a to another network access entity 3b or 3c (or 3d) may be referred to as inter-EPC-handover. In the data transmission system described herein, such an inter-EPC-handover is enabled without interrupting an existing connection from the handed over UE to the remote station 60, as described in the following.

In an initial configuration, UE 50 is assigned to network access entity 3b. The UE establishes a connection to the remote station 60 via network access entity 3b, data network 10, and network access entity 3d. Via the established connection, the UE 50 and the remote server 60 can bidirectionally exchange data. However, the remote station 60 and its network access entity 3d directs data packets for the UE 50 to the PGW of network access entity 3b and network access entity 3b internally and directly sends data to the UE 50. The data transmission path between the UE 50 and the remote station 60 prior to a handover or a mobility event is indicated by data flow 54.

In case of an intra-EPC-handover from one air interface to another interface of network access entity 3b, the UE 50 is still accessible via the network access entity 3b.

A mobility event (either motion of UE 50 or motion of network access entity 3b and/or 3a, or both) generally shown at arrow 52 is referred to as an inter-EPC-handover, as the UE 50 is handed over from network access entity 3b to network access entity 3a.

After the mobility event 52, the data from remote station 60 may, in a first instance, be still sent to network access entity 3b. After the inter-EPC-handover 52, network access entity 3b cannot directly access UE 50. Network access entity 3b may buffer the data until it is informed about the new network access entity of UE 50. New network access entity 3a informs former network access entity 3b (and the other network access entities in the data transmission system 1, especially the source network access entity 3d) that UE 50 has registered and is accessible via network access entity 3a now. Thus, interrupt or breaking down of connection 54 between remote station 60 and UE 50 after the inter-EPC-handover is avoided. Until source network access entity 3d is informed about the mobility event 52, data from remote station 60 and addressed to UE 50 is still directed to network access entity 3b and network access entity 3b forwards those data based on the updated UE mobility table to network access entity 3a, as indicated by data flow 56. However, as soon as former network access entity 3d is informed about the mobility event 52, former network access entity 3d directs data directly to new network access entity 3a, as indicated by data flow 58.

It is noted that this principle applies to a mobility event of any UE that is connected to data transmission system 1. The target UE 50 and/or the source station 60 may be subject to mobility events due to own movement or movement of their assigned network access entity. The UE mobility table is updated as a result of a mobility event and data packets are either forwarded by the former network access entity (see data flow 56) or redirected directly by the source network access entity to the new network access entity (see data flow 58) depending on the synchronization status of the UE mobility table. Data flow 56 and a corresponding forwarding of data packets is pertinent only as long as the synchronization of the UE mobility table is not completed at least for the target UE.

An inter-EPC-handover is transparent to data network 10 and any stations connected to the data network 10. An inter-EPC-handover 52 will not have any effect on existing connections of a UE and a remote station via data network 10, as the remote station continuously directs data to that network access entity at which the UE is registered when a connection is established (in FIG. 2, this is network access entity 3b).

After the inter-EPC-handover, the UE 50 establishes new connections via network access entity 3a, so that remote stations of the newly established connections will direct data directly to network access entity 3a.

Figure 3:
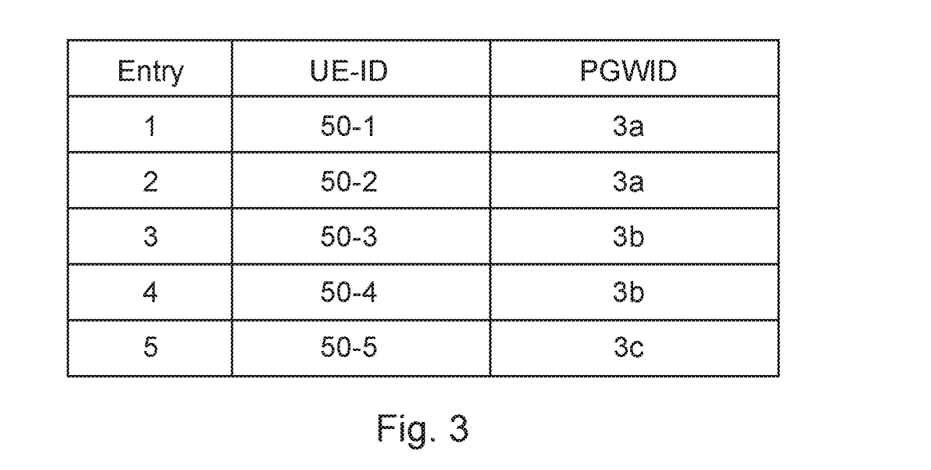
FIG. 3 schematically shows a UE mobility table of a network access entity according to an exemplary embodiment.

FIG. 3 shows an exemplary UE mobility table with an exemplary set of entries. It is noted that the mobility table may contain several other information relating to a UE or relating to a connection. However, the exemplary table of FIG. 3 is used for the purpose of illustrating the update after an inter-EPC-handover.

The mobility table may contain multiple entries (rows), each of which contains at least an ID of a UE (middle column, with the values 50-1, 50-2, etc.) and the ID of the network access entity (right column, with the values 3a, 3b, 3c) via which the respective UE is accessible at the moment. The entry number of the left column is indicated merely for the sake of brevity in order to be able to make reference to the entries in the description. It can be derived from the mobility table that multiple UEs may be assigned to a network access entity, see entries 1 and 2 which are related to different UEs 50-1 and 50-2 but the same network access entity 3a, and entries 3 and 4 with UEs 50-3, 50-4 being assigned to network access entity 3b. In one embodiment, the UEID may be a combination of an identifier of the UE and an assigned IP-address.

In a preferred embodiment, the UE mobility table is a key-value-store with the UEID of the UEs being used as the key.

In case of an inter-EPC-handover, the entry of the handed over UE is updated. For example, if UE 50-4 is handed over from network access entity 3b to network access entity 3c, UE 50-4 registers at network access entity 3c, network access entity 3c updates its mobility table and informs the remaining network access entities about the update such that all network access entities, in particular, the former network access entity 3b is enabled to forward data packets addressed to UE 50-4 to network access entity 3c and the source network access entity such that it directs data packets addressed to UE 50-4 directly to the new network access entity 3c.

Such an inter-EPC-handover may be required if either the UE or the network access entity or both change their location. The mobility handling may be implemented by mechanisms of SDN and a SDN controller may be installed on each network access entity so that the SDN controller accesses the UE mobility table and provides the information relating to the network access entity assigned to the target UE belonging to a given data packet or a data flow.

With reference to FIG. 2 and FIG. 3, the steps of the method described herein can also be recognized without repeating the steps in detail here. The method may be implemented by a network access entity or a user plane and control plane of an SDN.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof. The term "at least one of element A and element B" is to be interpreted as "element A" alone, "element B" alone, or "element A and element B". The same applies to a listing of more than two elements.

LIST OF REFERENCE SIGNS 1 data transmission system
3 network access entity
10 data network, backbone
11a first type access point
11b second type access point
11c third type access point
15 data flow controller
20 multi-protocol multi-topology router
30 service architecture evolution (SAE) gateway
32 packet data network gateway (PGW)
34 serving gateway (SGW)
36 UE mobility table, for example a key-value-database
40 evolved Node B (eNodeB)
50 user equipment (UE)
52 mobility event
54 data flow before mobility event
56 data flow after mobility event and prior to synchronization
58 data flow after mobility event and after synchronization
60 remote station, server

The invention claimed is:

1. A network access entity, which is configured to provide access to communication services of a data network to at least one user equipment (UE) comprising:
a first packet data network gateway (1PGW) with a first PGW identifier (1PGWID) which uniquely identifies the 1PGW; and
a first UE mobility table containing an assignment of a first UE identifier (1UEID) for a first UE (1UE) of the at least one UE to the 1PGW;
wherein the assignment indicates the 1PGWID of the 1PGW via which the 1UE is accessible from the data network;
wherein the network access entity implements a first functionality of a first evolved packet core (1EPC) in accordance with one of 3GPP standards and long term evolution (LTE) standards;
wherein the network access entity operates over a first range and is configured to:

execute at least one of a transmit data operation and a receive data operation of data between a remote station and the 1UE, via the data network;
assign a data flow from the remote station to the 1UE; and
when the 1UE leaves the first range;
update the first UE mobility table; and
reassign to the 1UE, a second PGWID (2PGWID) of a neighboring PGW (nPGW), of a neighboring network access entity;
wherein the reassigning occurs while the at least one of the transmit data operation and the receive data operation continue without interruption;
wherein the neighboring network access entity implements a functionality of a second EPC (2EPC) in accordance with the one of the 3GPP standards and the LTE standards;
wherein the 2EPC is distinct from the 1EPC;
wherein, when the 1UE leaves or enters the first range, the 1EPC broadcasts an update message to the second EPC;
wherein the second EPC utilizes the update message to update a second UE mobility table; and
wherein, upon execution of the update message, the second UE mobility table is synchronized with the first UE mobility table.

2. The network access entity of claim 1,
wherein the network access entity is configured to update the first UE mobility table when a second UE (2UE) enters the first range of the network access entity by creating an entry or updating an existing entry for the 2UE in the first UE mobility table and to assign a second PGWID (2PGWID) to a second UEID (2UEID) of the 2UE.

3. The network access entity of claim 2,
wherein the network access entity is configured to broadcast an update of the first UE mobility table to neighboring network access entities when at least one of the 1UE and the 2UE enters the first range.

4. The network access entity of claim 1,
wherein the network access entity is configured to search the first UE mobility table for a UEID to which a received data packet is addressed to and to read out from the first UE mobility table a PGWID of a PGW to which the UEID of the received data packet is assigned; and
wherein the network access entity is configured to forward the received data packet to the PGW with the read out PGWID.

5. The network access entity of claim 1,
wherein the network access entity is configured to dynamically assign a UEID to a UE if a UE enters the first range of the network access entity and to update the first UE mobility table with an assigned UEID and a corresponding PGWID.

6. The network access entity of claim 1,
wherein the network access entity implements the functionality of the 1EPC according to one of the following communication standards: 3GPP Release 8, 3GPP Release 9, 3GPP Release 10, 3GPP Release 11, 3GPP Release 12, 3GPP, Release 13.

7. A data transmission system, comprising:
a data network;
a first network access entity (1NAE), operating over a first range, implementing at least one first evolved packet core (1EPC) functionality in accordance with at least one of 3GPP standards and long term evolution (LTE) standards;
a second network access entity (2NAE), operating over a second range, implementing at least one second EPC (2EPC) functionality in accordance with at least one of the 3GPP standards and the LTE standards;
wherein the 1NAE is distinct from the 2NAE;
wherein the 1NAE is configured to provide access to communication services of a data network to a first user equipment (1UE) and comprises:
a first packet data network gateway (1PGW) with a first PGW identifier (1PGWID) which uniquely identifies the 1PGW; and
a first UE mobility table containing an assignment of a first UE identifier (1UEID) of the 1UE to a PGW,
wherein the assignment indicates a PGWID of a PGW via which the 1UE is accessible from the data network;
wherein the 2NAE is configured to provide access to communication services of a data network to the 1UE and comprises:
a second packet data network gateway (2PGW) with a second PGW identifier (2PGWID) which uniquely identifies the 2PGW; and
a second UE mobility table containing an assignment of the 1UEID to the PGW,
wherein the assignment indicates the PGWID via which the 1UE is accessible from the data network;
wherein the 1NAE is configured to:
execute at least one of a transmit data operation and a receive data operation to and from a remote station, respectively, via the data network; and
when the 1UE leaves the first range and enters the second range:
assign a data flow from the remote station to one of the 1UE;
update the first UE mobility table; and
reassign a second PGWID (2PGWID) of a second PGW (2PGW) of the 2NAE to the 1UE; and
wherein the 1NAE and the 2NAE are connected to the data network so as to enable transmission of data therebetween; and
wherein the data transmission system is configured to synchronize the first UE mobility table of the 1NAE with a second UE mobility table of the 2NAE;
wherein the 1EPC communicates an update message to the 2EPC; and
wherein, upon execution of the update message, the second UE mobility table is synchronized with the first UE mobility table.

8. The data transmission system of claim 7,
wherein at least one of the 1NAE and the 2NAE is located onboard a mobile platform.

9. The data transmission system of claim 7, further comprising:
a multitude of user equipment (UE) devices, each of which is uniquely assigned to either the 1NAE or the 2NAE;
wherein the assignment of each of the UE devices to the 1NAE or the 2NAE is indicated by an entry in the first UE mobility table and an entry in the second UE mobility table; and
wherein the entry in the first UE mobility table and the entry in the second UE mobility table contains a UE identifier (UEID) and a packet data network gateway identifier (PGWID) of an assigned packet data network gateway (PGW).

10. The data transmission system of claim 7,
wherein the 1NAE is further configured to:
update the first UE mobility table if the 1UE enters the first range;
assign the 1UEID to the 1PGWID; and
communicate the update of the first UE mobility table to the 2NAE.

11. The data transmission system of claim 10,
wherein the 2NAE is configured to forward data packets addressed to the 1UE to the 1NAE.

12. A method for operating a data transmission system comprising:
registering a first user equipment device (1UE) at a first network access entity (1NAE);
wherein the 1NAE implements a first functionality of a first evolved packet core (1EPC) in accordance with one of 3GPP standards and long term evolution (LTE) standards;
assigning an identifier of the 1NAE to the 1UE;
wherein the identifier indicates via which network access entity the 1UE is accessible;
assigning, in a first mobility table, a first UE identifier (1UEID) for the 1UE to a first packet data network gateway (1PGW);
wherein the 1PGW is uniquely identified by a first PGW identifier (1PGWID); and
wherein the first mobility table identifies the 1PGWID of the 1PGW via which the 1UE is accessible on a data network;
handing over the 1UE from the 1NAE to a second network access entity (2NAE);
assigning a 2NAE identifier to the 1UE and informing the 1NAE about this assignment;
storing, by the 1NAE, the the assigned 2NAE identifier as an access point for forwarding data received by the 1NAE and addressed to the 1UE;
wherein the 1NAE operates over a first range and is further configured to:
execute at least one of a transmit data operation and a receive data operation of data to and from a remote station, respectively;
assign a data flow from the remote station to the 1UE;
update the first mobility table when the 1UE leaves the first range; and
reassign to the 1UE, a second PGWID (2PGWID) of a neighboring PGW (nPGW), of a neighboring network access entity;
wherein the neighboring network access entity implements a functionality of a second EPC (2EPC) in accordance with the one of the 3GPP standards and the LTE standards;
wherein the second EPC is distinct from the 1EPC;
wherein the 1EPC is configured to broadcast an update message of the first mobility table to the 2EPC when the 1UE leaves or enters the first range; and
wherein the 2EPC utilizes the update message to update a second UE mobility table; and
wherein, upon execution of the update message, the second UE mobility table is synchronized with the first mobility table.

13. The method of claim 12, further comprising:
forwarding, by the 1NAE, data packets addressed to the 1UE to the 2NAE in accordance with the assigned 2NAE identifier.

14. The method of claim 12, further comprising:
broadcasting an assigned identifier of a network access entity to the 1UE to other network access entities such that all network access entities within a network compound contain an entry relating to accessibility of the 1UE.

* * * * *